US011701963B2

(12) United States Patent
Sawai (10) Patent No.: US 11,701,963 B2
(45) Date of Patent: *Jul. 18, 2023

(54) HIGH PRESSURE CONTAINER

(71) Applicant: TOYOTA JIDOSHA KABUSHIKI KAISHA, Toyota (JP)

(72) Inventor: Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,622

(22) Filed: Nov. 26, 2021

(65) Prior Publication Data

US 2022/0080824 A1 Mar. 17, 2022

Related U.S. Application Data

(62) Division of application No. 16/050,353, filed on Jul. 31, 2018, now Pat. No. 11,247,554.

(30) Foreign Application Priority Data

Aug. 10, 2017 (JP) ................................. 2017-155793

(51) Int. Cl.
*B60K 15/03* (2006.01)
*B65D 1/26* (2006.01)
(Continued)

(52) U.S. Cl.
CPC .............. *B60K 15/03* (2013.01); *B60K 15/07* (2013.01); *B65D 1/26* (2013.01); *F17C 13/08* (2013.01);
(Continued)

(58) Field of Classification Search
CPC .......... B60K 15/07; B60K 2015/03315; B60K 15/03; F17C 13/08
See application file for complete search history.

(56) References Cited

U.S. PATENT DOCUMENTS 2,968,163 A 1/1961 Beckman
4,139,019 A 2/1979 Bresie
(Continued)

FOREIGN PATENT DOCUMENTS

CN 204109794 U 1/2015
CN 106233060 A 12/2016
(Continued)

OTHER PUBLICATIONS

Office Action issued in Japanese Patent Application No. 2017-155793 dated Nov. 4, 2020.
(Continued)

*Primary Examiner* — Anthony D Stashick
*Assistant Examiner* — Blaine G Neway
(74) *Attorney, Agent, or Firm* — Oblon, McClelland, Maier & Neustadt, L.L.P.

(57) ABSTRACT

There is provided a high pressure container including a plurality of container bodies, each of the container bodies housing a fluid in a huh pressure state and being able to release the fluid through a release portion, (ii) opening section that is linked to the container bodies, and that opens at or above a predetermined opening temperature to release the fluid inside the container bodies, and (iii) a cover member that straddles the plurality of container bodies, that covers at least a portion of the plurality of container bodies, that is able to withstand a temperature of no less than the opening temperature, that is linked to the opening section, and that is capable of transmitting heat to the opening section.

11 Claims, 5 Drawing Sheets

(51) Int. Cl.
*F17C 13/12* (2006.01)
*F17C 13/08* (2006.01)
*B60K 15/07* (2006.01)
*H01M 8/0438* (2016.01)
*B60K 8/00* (2006.01)
*H01M 8/04082* (2016.01)
*B60K 15/063* (2006.01)

(52) U.S. Cl.
CPC ............... *F17C 13/12* (2013.01); *B60K 8/00* (2013.01); *B60K 2015/03315* (2013.01); *B60K 2015/0634* (2013.01); *F17C 2201/0109* (2013.01); *F17C 2201/056* (2013.01); *F17C 2201/058* (2013.01); *F17C 2205/0111* (2013.01); *F17C 2205/0146* (2013.01); *F17C 2205/0317* (2013.01); *F17C 2205/0332* (2013.01); *F17C 2221/012* (2013.01); *F17C 2223/0123* (2013.01); *F17C 2260/018* (2013.01); *F17C 2270/0178* (2013.01); *F17C 2270/0184* (2013.01); *H01M 8/04201* (2013.01); *H01M 8/04425* (2013.01); *H01M 2250/20* (2013.01)

(56) References Cited

U.S. PATENT DOCUMENTS

| | | |
|---|---|---|
| 5,603,360 A | 2/1997 | Teel |
| 5,658,013 A | 8/1997 | Bees |
| 6,257,360 B1 | 7/2001 | Wozniak |
| 2003/0006349 A1 | 1/2003 | Sadowski |
| 2008/0066805 A1 | 3/2008 | Winter et al. |
| 2011/0127263 A1 | 6/2011 | Lee et al. |
| 2017/0167662 A1 | 6/2017 | Schwartz |

FOREIGN PATENT DOCUMENTS

| | | |
|---|---|---|
| DE | 102012006367 A1 | 4/2013 |
| JP | 2000-343958 A | 12/2000 |
| JP | 2002-528331 A | 9/2002 |
| JP | 2003-262299 A | 9/2003 |
| JP | 2004-257413 | 9/2004 |
| JP | 2005-315294 | 11/2005 |
| JP | 2008-291891 | 12/2006 |
| JP | 2008-49967 | 3/2008 |
| JP | 2015-175416 A | 10/2015 |

OTHER PUBLICATIONS

Chinese Office Action dated Nov. 2, 2021 in Chinese Patent Application No. 201810750870.9 (with English translation), citing document AA therein, 15 pages.

Chen Peilin, "Air Conditioning and Refrigeration Technology Manual", "Fusible Plug", pp. 763-764 and attached Figure 17.5 and Table 17.1 Apr. 30, 1999, (30 pages).

HIGH PRESSURE CONTAINER

CROSS-REFERENCE TO RELATED APPLICATION

This application is a division of U.S. patent application Ser. No. 16/050,353 filed Jul. 31, 2018. which claims priority under 35 USC 119 from Japanese Patent application No. 2017-155793 tiled Aug. 10, 2017, the disclosure of each of which is incorporated by reference herein.

BACKGROUND

Technical Field

The present disclosure relates to a high pressure container in which a fluid is housed in a high pressure state.

Related Art

There are high pressure tanks in which a connection terminal of a high-thermal-conductivity member is fixed to both a safety valve and one side end portion of a tank body. For example, see Japanese Patent Application Laid-Open (JP-A) No. 2005-315294. An exposed end of the high-thermal-conductivity member on the opposite side of the high-thermal-conductivity member to the connection terminal extends along the tank body toward the other side of the tank body. When a portion of the tank body on this other side and the high-thermal-conductivity member are heated by a heal source in the vicinity of the other side portion of the tank body, heat imparted to the high-thermal-conductivity member from the heat source is transmitted through the high-thermal-conductivity member to the safety valve. The safety valve thus opens, releasing fuel gas such as high pressure hydrogen inside the tank body to the exterior of the tank body through the safety valve.

However, in configurations in which plural tank bodies are provided, due to providing a high-thermal-conductivity member to each tank body, it becomes difficult to suppress an increase in the number of components.

SUMMARY

The present disclosure obtains a high pressure container enabling an increase in the number of components to be suppressed.

A first aspect of the present disclosure is a high pressure container including plural container bodies, an opening section, and a cover member. Each of the container bodies houses a fluid in a high pressure state, and is able to release the fluid through a release portion. The opening section is linked to the container bodies, and opens at or above a predetermined ripening temperature to release the fluid inside the container bodies. The cover member straddles the plural container bodies, and covers at least a portion of the plural container bodies. Moreover, the cover member is able to withstand a temperature of no less than the opening temperature, is linked to the opening section, and is capable of transmitting heat to the opening section.

In the first aspect, heat is transmitted to the ripening section by the cover member. Accordingly, when heat imparted to the opening section is at or above the opening temperature, the opening section opens to release the fluid from inside the plural container bodies.

The cover member is provided straddling the plural container bodies. Accordingly, there is no need to individually provide each of the plural container bodies with a section to transmit heat from the container body side to the opening section side, thereby enabling an increase in the number of components to be suppressed.

A high pressure container of a second aspect of the present disclosure is the first aspect, wherein the cover member is larger than the plural container bodies as viewed along a direction in which the cover member and the plural container bodies face each other.

According to the second aspect, the cover member is larger than the plural container bodies as viewed along the direction in which the cover member and the plural container bodies face each other. This thereby enables the plural container bodies to be suppressed from being directly heated by a heat source in cases in which a hear source is present on the opposite side of the cover member to the container bodies.

A high pressure container of a third aspect of the present disclosure is either the first aspect or the second aspect, wherein the cover member is capable of housing the plural container bodies inside the cover member, and the plural container bodies are covered by the cover member from plural directions by being housed inside the cover member.

In the third aspect, the plural container bodies are covered by the cover member from plural directions, thereby enabling the container bodies to he protected by the cover member.

A high pressure container of a fourth aspect of the present disclosure is the first aspect to the third aspect, wherein a thermal conductivity of the cover member is higher than a thermal conductivity at a surface of container bodies.

According to the fourth aspect, thermal conductivity of the cover member is higher than thermal conductivity at a surface of the container bodies, thereby enabling heat to be transmitted to the opening section quickly by the cover member.

A high pressure container of a fifth aspect of the present disclosure is the first aspect to the fourth aspect, further including a low thermal conductivity layer. The low thermal conductivity layer is provided between the cover member and the plural container bodies, and has lower thermal conductivity than the cover member.

According to the fifth aspect, the low thermal conductivity layer provided between the cover member and the plural container bodies has lower thermal conductivity than the cover member. This thereby enables heat to be suppressed from being transmitted to the container bodies in cases in which the cover member is heated from the opposite side to the plural container bodies.

A high pressure container of a sixth aspect of the present disclosure is the fifth aspect, wherein the low thermal conductivity layer is configured by a layer of air.

According to the sixth aspect, the low thermal conductivity layer is configured by a layer of air. Accordingly, disposing the container bodies spaced apart from the cover member enables the low thermal conductivity layer to be provided between the container bodies and the cover member.

A high pressure container of a seventh aspect of the present disclosure is the first aspect to the sixth aspect, wherein the plural container bodies are linked through a communicating section so as to be in communication with each other.

In the seventh aspect, the plural container bodies are linked through the communicating section so as to be in communication with each other. This thereby increases, for example, the degrees of freedom for design of the overall shape of the high pressure container in consideration of such factors as the pressure resistance of the container bodies.

A high pressure container of an eighth aspect of the present disclosure is the seventh aspect, wherein the communicating section includes a single passageway that is linked to all of the container bodies and through which the fluid that has left the container bodies passes. The opening section is provided to the passageway.

In the eighth aspect, the communicating section includes the single passageway. The passageway is linked to all of the container bodies, and the fluid that has left the container bodies passes through the passageway. Note that since the opening section is provided to the passageway of the communicating section, opening the opening section enables the fluid in all of the container bodies to be released.

A high pressure container of a ninth aspect of the present disclosure is the first aspect to the sixth aspect, wherein plural of the opening sections are provided corresponding to each of the release portions of the plural container bodies.

In the ninth aspect, the opening sections are provided corresponding to each of the release portions of the plural container bodies. This thereby enables fluid to be released from inside the container bodies through an opening section that has been heated to the opening temperature.

A high pressure container of a tenth aspect of the present disclosure is the first aspect to the ninth aspect, wherein the plural container bodies are disposed alongside one another in a row along a vehicle width direction or are disposed alongside one another in a row along a vehicle front-rear direction at a vehicle lower side of a floor section of a vehicle.

In the tenth aspect, the plural container bodies are disposed alongside one another in a row along the vehicle width direction or are disposed alongside one another in a row along the vehicle front-rear direction at the vehicle lower side of the floor section of the vehicle. The cover member is provided at least at a lower side of the plural container bodies. This thereby enables a large difference to be suppressed from arising between the respective container bodies for conditions such as a heating state of the respective container bodies in cases in which the plural container bodies are heated from the vehicle lower side of the cover member.

As described above, the first aspect enables an increase in the number of components to be suppressed.

The second aspect enables direct heating of the plural container bodies by a heat source to be suppressed in cases in which the heat source is present on the opposite side of the cover member to the container bodies.

The third aspect enables the plural container bodies to be protected by the cover member.

The fourth aspect enables heat to be transmitted to the opening section quickly by the cover member.

The fifth aspect enables transmission of heat to the container bodies to be suppressed in cases in which the cover member is heated from the opposite side to the container bodies.

In the sixth aspect, disposing the container bodies spaced apart from the cover member enables the low thermal conductivity layer to be provided between the container bodies and the cover member.

The seventh aspect improves the degrees of freedom for design in the overall shape of the high pressure container in consideration of such factors as the pressure resistance of the container bodies.

In the eighth aspect, opening the opening section enables the fluid inside all of the container bodies to be released.

The ninth aspect enables the fluid inside the container bodies to be released through an opening section that has been heated to the opening temperature.

The tenth aspect enables a large difference to be suppressed from arising between the respective container bodies for conditions such as a heating state of the respective container bodies in cases in which the plural container bodies are heated from the vehicle lower side of the cover member.

BRIEF DESCRIPTION OF THE DRAWINGS

Exemplary embodiments of the present disclosure will be described in detail based on the following figures, wherein.

DETAILED DESCRIPTION

Explanation follows regarding exemplary embodiments of the present disclosure, with reference to FIG. 1 to FIG. 5. Note that in each of the drawings, the arrow FR indicates the front of a fuel cell vehicle 12 (referred to hereafter as the "vehicle 12" as appropriate). The vehicle 12 is vehicle applied with a high pressure tank 10, this being a high pressure container. The arrow OUT indicates a vehicle width direction outer side, and the arrow UP indicates the vehicle upper side. In the explanation of each exemplary embodiment, portions that are basically the same as those in earlier exemplary embodiments are allocated the same reference numerals, and detailed explanation thereof is omitted.

Configuration of the First Exemplars Embodiment

Outline of the Fuel Cell Vehicle 12

Figure 1:
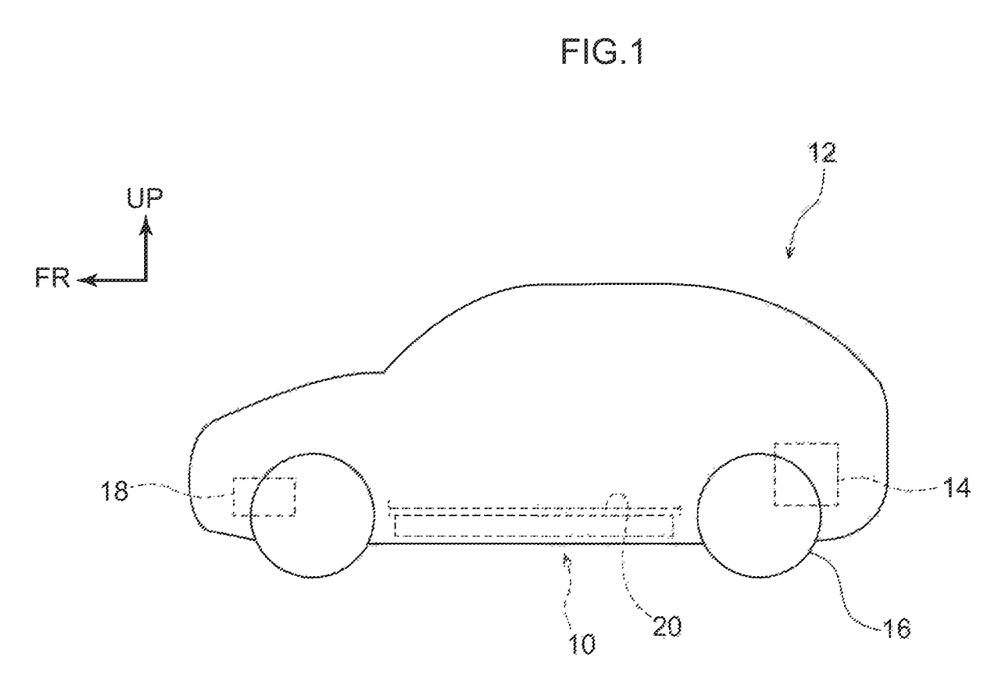
FIG. 1 is a schematic side view illustrating a fuel cell vehicle applied with a high pressure tank according to a first exemplary embodiment.

The vehicle 12 applied with the high pressure tank 10 is provided a drive motor 14, serving, as a drive unit. The drive motor 14 is, for example, disposed in a vehicle rear section of the vehicle 12. The drive motor 14 is mechanically connected to rear wheels 16, serving as drive wheels, of the vehicle 12, either directly, or indirectly through a transmission such as a reduction gear chain. Drive force output from the drive motor 14 is transmitted to the rear wheels 16.

Moreover, a fuel cell stack 18, serving as a power source, is provided in a vehicle front section. The fuel cell stack 18 has a stacked structure configured by stacking plural individual cells, these being configuration units, and functions as a high voltage power source. The fuel cell stack 18 is connected to the high pressure tank 10 and to an air compressor. Each individual cell configuring the fuel cell stack 18 generates electricity through an electrochemical reaction between a fluid, or hydrogen gas serving as fuel gas, supplied from the high pressure tank 10, and oxygen in compressed air supplied from the air compressor, not illustrated in the drawings.

A storage battery, not illustrated in the drawings, is also provided to the vehicle 12. The storage battery is a rechargeable secondary battery, and a nickel-hydrogen secondary battery, a lithium-hydrogen secondary battery, or the like may be employed therefor. Electric power is supplied to the drive motor 14 from the storage battery in order to drive the drive motor 14, and during braking of the vehicle 12, regenerated power arising in the drive motor 14 is recovered by the storage battery to recharge the storage battery.

High Pressure Tank 10 Configuration

Figure 2:
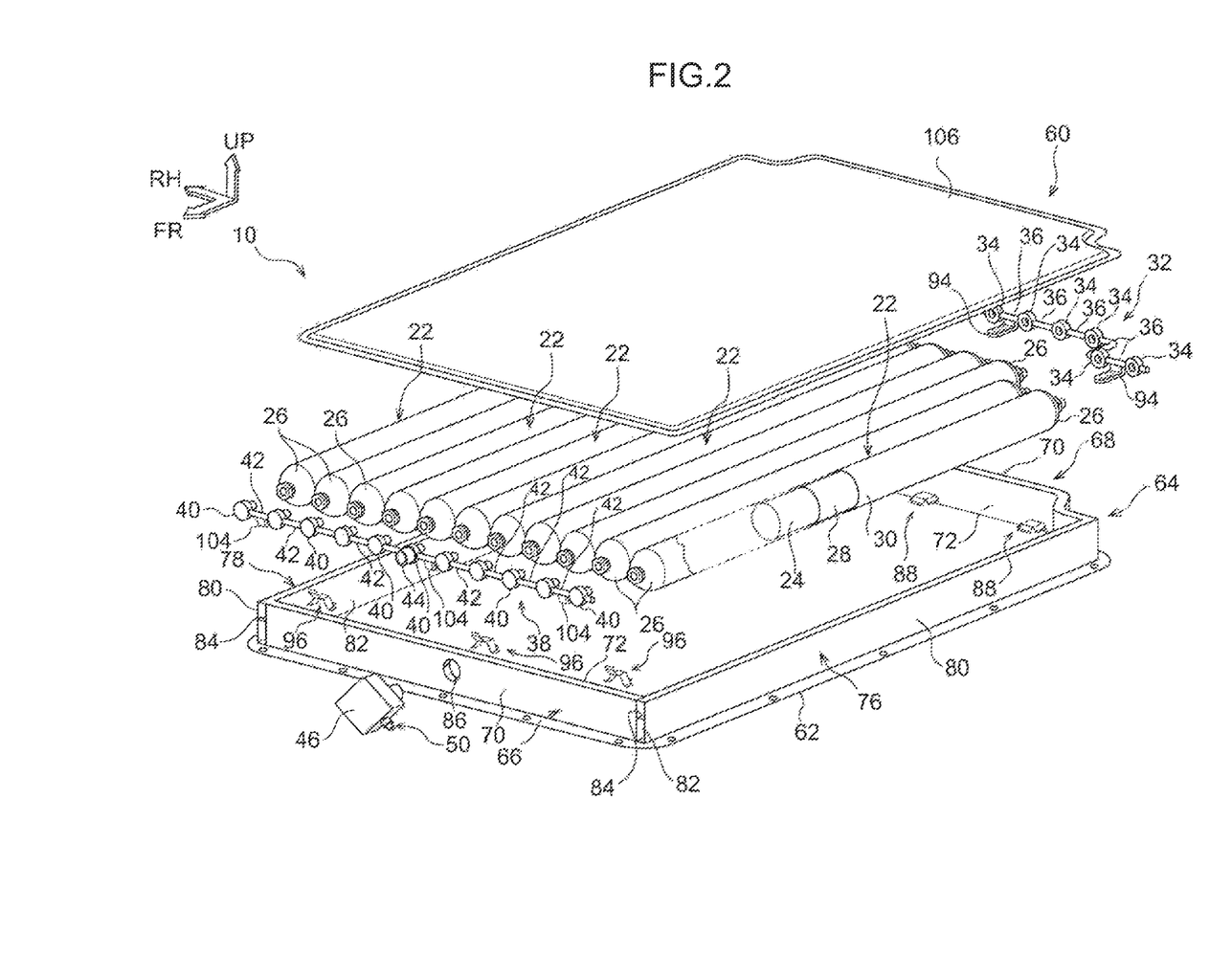
FIG. 2 is an exploded perspective view or a high pressure tank according to the first exemplary embodiment.
Figure 4:
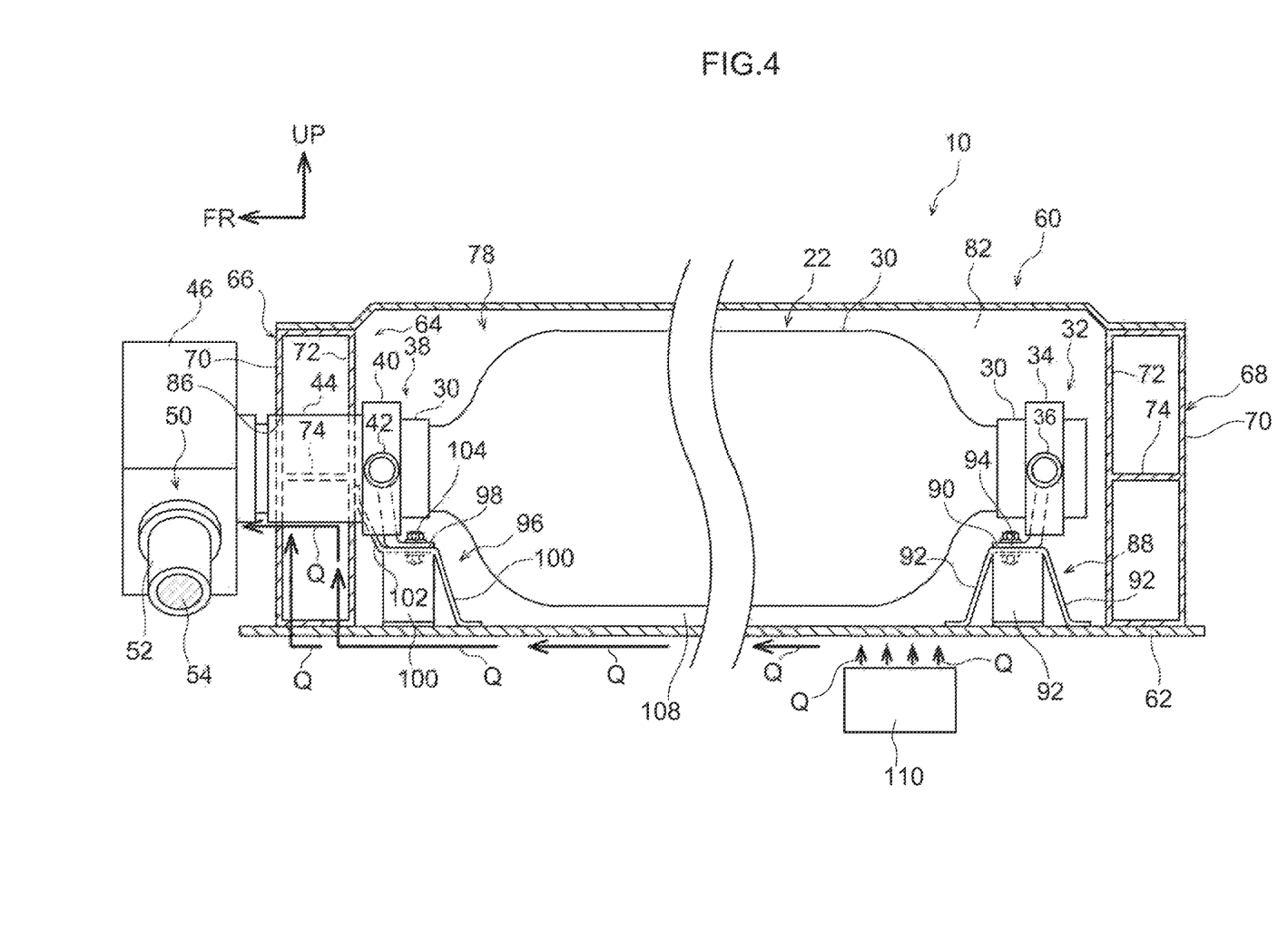
FIG. 4 is a side view cross-section illustrating a vehicle front portion and a vehicle rear portion or a high pressure tank according to the first exemplary embodiment.

As illustrated in FIG. 1, the high pressure tank 10 is provided at the vehicle lower side of a floor panel serving as a floor section or a vehicle body of the vehicle 12 at a vehicle front-rear direction intermediate section of the vehicle 12. As illustrated in FIG. 2 and FIG. 4 the high pressure tank 10 includes plural tank bodies 22 serving as container bodies. The tank bodies 22 are formed in substantially circular cylinder shapes, and the length direction (axial center direction) of each tank body 22 runs along the vehicle from-rear direction. The tank bodies 22 are provided alongside one another in in a row (a layer) along the vehicle width direction. Moreover, the tank bodies 22 are laid out close to one another in the vehicle width direction. A spacing between neighboring tank bodies 22 in the vehicle width direction is set sufficiently narrower than a diameter dimension of an outer peripheral portion of each tank body 22. The plural tank bodies 22 are thus disposed so as to collectively form a flattened shape that is thin in the vehicle vertical direction.

Each tank body 22 includes a casing body 24. The casing bodies 24 are formed from an aluminum alloy, for example. Each a casing body 24 has circular cylinder shape that is long in the vehicle front-rear direction, and each casing body 24 is open at both vehicle front-rear direction ends. Caps 26, serving as release portions are provided at both vehicle front-rear direction ends of each casing body 24. The caps 26 are formed in tube shapes. An external diameter dimension and internal diameter dimension of the cap 26 at the front of each casing body 24 become smaller on progression toward the vehicle front, and an external diameter dimension and internal diameter dimension of the cap 26 at the vehicle rear of each casing body 24 become smaller on progression toward the vehicle rear.

A first reinforcing layer 28 is provided on an outer face of the casing body 24. The first reinforcing layer 28 is formed from what is referred to as carbon fiber reinforced plastic (CFRP). Namely, the first reinforcing layer 28 includes a sheet member not illustrated in the drawings). The sheet member is configured including carbon fibers, and a fiber orientation of the carbon fibers (length direction of the carbon fibers) of the sheet number of the first reinforcing layer 28 runs in a circumferential direction of the casing body 24. The sheet member is impregnated with a thermosetting resin such as an epoxy resin, and the sheet member of the first reinforcing layer 28 is heated in a state wrapped around an outer face of the casing body 24. The first reinforcing layer 28 is thus formed at the outer face of the casing body 24.

A second reinforcing layer 30 is provided on an outer lace of the first reinforcing layer 28. The second reinforcing layer 30 is formed from CFRP. The second reinforcing layer 30 includes elongated thread-like filaments. The filaments are formed of gathered carbon fibers, and the filaments are, for example, impregnated with a thermosetting resin such as an epoxy resin. The filaments are wound onto the outer face of the first reinforcing layer 28 and outer faces of the caps 26 in a state inclined at a predetermined angle toward one radial direction side of the casing body 24 with respect to the axial center direction of the casing body 24 (the vehicle front-rear direction). The second reinforcing layer 30 is formed by heating the filaments in this state.

Figure 3:
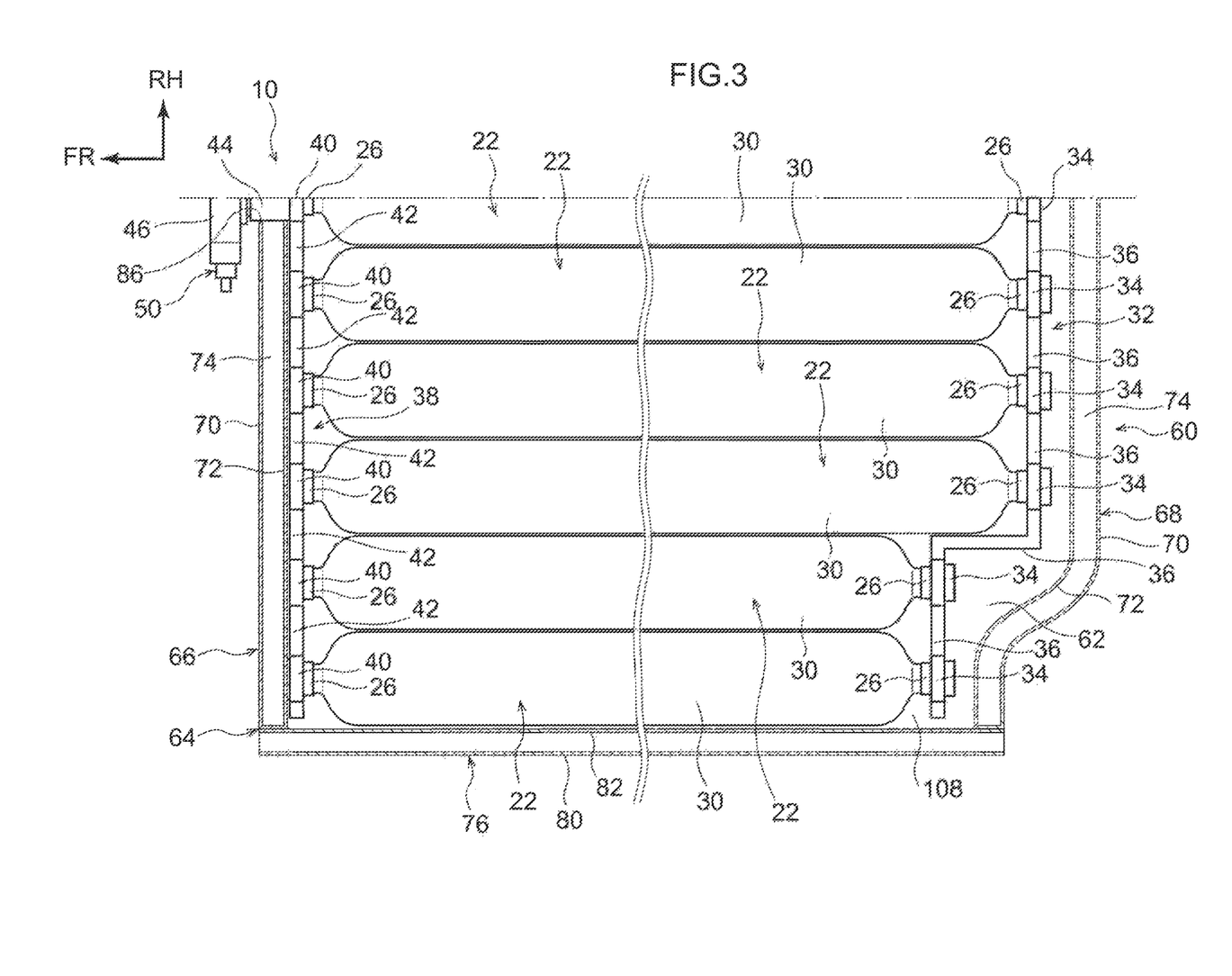
FIG. 3 is a plan view cross-section illustrating a high pressure tank according to the first exemplary embodiment, from substantially the vehicle width direction center toward the vehicle left side.

A first manifold 32, serving as a communicating section, is provided at the vehicle rear of the plural tank bodies 22, and a second manifold 38, serving as a communicating section and an intermediate heat transmitting section, is provided at the vehicle front of the plural tank bodies 22. The first manifold 32 and the second manifold 38 are, for example, formed front a metal such as aluminum or all aluminum alloy. The thermal conductivity of the first manifold 32 and the second manifold 38 is higher than the thermal conductivity of the CFRP configuring the first reinforcing lavers 28 of the tank bodies 22 and the CFRP configuring the second reinforcing layers 30 of the tank bodies 22, and is also higher than the thermal conductivity of air.

The first manifold 32 includes plural first connectors 34. The first connectors 34 are connected to vehicle rear end portions of the caps 26 at the vehicle rear of the tank bodies 22. The interiors of the first connectors 34 are linked to the interiors of the vehicle rear caps 26 (namely, the interiors of the tank bodies 22). The first manifold 32 also includes first tubes 36. Mutually adjacent first connectors 34 in the vehicle width direction are coupled together by the first tubes 36. The first tubes 36 are tube shaped, and the interiors of the first tubes 36 are linked to the interiors of the first connectors 34. The interiors of each of the plural tank bodies 22 are thus linked together through the first manifold 32.

The second manifold 38 includes plural second connectors 40. The second connectors 40 are connected to vehicle front end portions of the caps 26 at the vehicle front of the tank bodies 22. The interiors of the second connectors 40 are linked to the interiors of the vehicle front caps 26 (namely, the interiors of the tank bodies 22). The second manifold 38 also includes second tubes 42. Mutually adjacent second connectors 40 in the vehicle width direction are coupled together by the second tubes 42. The second tubes 42 are tube shaped, and the interiors of the second tubes 42 are linked to the interiors of the second connectors 40. The interiors of each of the plural tank bodies 22 are thus linked together through the second manifold 38.

The second manifold 38 further includes a third tube 44. The third tube 44 is configured with a circular cylinder shape that is penetrated in the vehicle front-rear direction, and serves as a passageway of the present disclosure. A vehicle rear end of the third tube 44 is coupled to the second connector 40 disposed at the vehicle width direction center of the plural second connectors 40, and the interior of the third tube 44 is linked to the interior of the vehicle width direction center second connector 40. When high pressure hydrogen gas, serving as the fluid inside the tank bodies 22, is discharged from inside the tank bodies 22 into the second connectors 40 of the second manifold 38, the hydrogen as thus flows toward the third tube 44 of the second manifold 38.

A valve 46, serving as a flow regulator and an intermediate heat transmitting section., is provided at the vehicle front of the third tube 44 of the second manifold 38. The valve 46 includes a tube-shaped coupler (not illustrated in the drawings), and an outer peripheral face of the coupler is formed with a male thread. The coupler of the valve 46 is inserted into the third tube 44 of the second manifold 38 from the vehicle front end of the third tube 44, and is screwed into a female thread formed at an inner peripheral face of the third tube 44. The valve 46 is thereby coupled to the third tube 44 of the second manifold 38. The valve 46 is also connected to the aforementioned storage battery (not illustrated in the drawings) through a connection section such as a pipe, so as to supply hydrogen gas to the storage battery via the third tube 44 of the second manifold 38 and the valve 46.

The valve 46 is provided with a fusible plug 50, serving as an opening section. The fusible plug 50 includes a substantially circular cylinder shaped cylinder body 52. An outer peripheral face of one end side of the cylinder body 52 is formed with a male thread, and one end side portion of the cylinder body 52 is screwed into a female threaded hole formed in the valve 46. The cylinder body 52 is linked to the interior of the valve 46 upstream (toward the second manifold 38) of a valve body (not illustrated in the drawings) provided to the valve 46.

A plug 54 is provided inside the cylinder body 52. The plug 54 is, for example, formed from a metal with a low melting point, such as lead or tin, and the cylinder body 52 is closed off by the plug 54. Accordingly, under normal circumstances, hydrogen gas flowing from the third tube 44 of the second manifold 38 toward valve 46 is not released to the exterior through the cylinder body 52 of the fusible plug 50. However, if the cylinder body 53 of the fusible plug 50 is heated and the temperature of the cylinder body 52 reaches a predetermined opening temperature (namely, the melting temperature of the plug 54) or greater, the plug 54 melts, thereby opening up the interior of the cylinder body 52. In this state, hydrogen gas that has flowed into the valve 46 from the third tube 44 of the second manifold 38 can be released to the exterior through the cylinder body 52 of the fusible plug 50.

The high pressure tank 10 further includes a case 60, serving as a cover member. The case 60 includes a bottom wall 62. The bottom wall 62 has a substantially rectangular plate shape in plan view the bottom wall 62 is configured with a size enabling the plural tank bodies 22 to be disposed over the bottom wall 62 in a state arranged alongside one another in the vehicle width direction (namely, in plan view, the shape of the bottom wall 62 is larger than the shape of all of the plural tank bodies 22 in plan view when the plural tank bodies 22 are in a state arranged alongside one another in the vehicle width direction). In a state in which plural of the tank bodies 22 are disposed over the bottom wall 62, the bottom wall 62 straddles the plural tank bodies 22. A front wall 66 configuring a peripheral wall 64 is provided at the vehicle upper side of a vehicle front end portion of the bottom wall 62, and a rear wall 68 configuring the peripheral wall 64 is provided at the vehicle upper side of a vehicle rear end portion of the bottom wall 62. A lower end portion of each of the front wall 66 and the rear wall 68 is fixed to the bottom wall 62.

The front wall 66 and the rear wall 68 each include a first outer plate 70. First inner plates 72 are provided at the vehicle rear of the first outer plate 70 of the front wall 66, and at the vehicle front of the first outer plate 70 of the rear wall 68. The first outer plates 70 and the first inner plates 72 are each formed in a flat plate shape, and length directions of each of the first outer plates 70 and the first inner plates 72 run along the vehicle width direction. Width directions of each of the first outer plates 70 and the first inner plates 72 ran along the vehicle vertical direction. The first inner plate 72 of the front wall 66 faces the first outer plate 70 of the front wall 66 from the vehicle rear of the first outer plate 70 of the front wall 66, and the first inner plate 72 of the rear wall 68 faces the first outer plate 70 of the rear wall 68 from the vehicle front of the first outer plate 70 of the rear wall 68.

First horizontal plates 74 are respectively provided between the first outer plate 70 and the first inner plate 72 of the front wall 66, and between the first outer plate 70 and the first inner plate 72 of the rear will 68. Each first horizontal plate 74 is formed in a flat plate shape, and a length direction of each first horizontal plate 74 runs along the vehicle width direction. A width direction of each first horizontal plate 74 runs along the vehicle front-rear direction. The first horizontal plates 74 are disposed at vehicle vertical direction intermediate portions (for example the vehicle vertical direction centers) of the first outer plates 70 and the first inner plates 72. The first outer plate 70 and the first inner plate 72 are linked together by the first horizontal plate 74 so as to form an integral unit.

The case 60 is further provided with a left wall 76 configuring the peripheral wall 64 at the vehicle upper side of a vehicle width direction left side edge of the bottom wall 62, and provided with a right wall 78 configuring the peripheral wall 64 at the vehicle upper side of a vehicle width direction right side edge of the bottom wall 62. A vehicle lower end portion of each of the left wall 76 and the right wall 78 is fixed to the bottom wall 62.

The left wall 76 and the right wall 78 each include a second outer plate 80. Second inner plates 82 are provided at the vehicle width direction inner side of the second outer plate 80 of the left wall 76, and at the vehicle width direction inner side of the second outer plate 80 of the right wall 78. The second outer plates 80 and the second inner plates 82 are each formed in a flat plate shape, and length directions of each of the second outer plates 80 and the second inner plates 82 run along the vehicle front-rear direction. Width directions of each of the second outer plates 80 and the second inner plates 82 run along the vehicle vertical direction. The second inner plate 82 of the left wall 76 faces the second outer plate 80 of the left wall 76 tram the vehicle width direction right side of the second outer plate 80 of the left wall 76, and the second inner plate 82 of the right wall 78 faces the second cutter plate 80 of the right wall 78 from the vehicle width direction left side of the second outer plate 80 of the right wall 78.

Second horizontal plates 84 are respectively provided between the second outer plate 80 and the second inner plate 82 of the left wall 76, and between the second outer plate 80 and the second inner plate 82 of the right wall 78. Each second horizontal plate 84 is thrilled in a flat plate shape, and a length direction of each second horizontal plate 84 runs along the vehicle front-rear direction. A width direction of each second horizontal plate 84 runs along the vehicle width direction. The second horizontal plates 84 are disposed at vehicle vertical direction intermediate portions (for example the vehicle vertical direction centers) of the second outer plates 80 and the second inner plates 82. The second outer plate 80 and the second inner plate 82 are linked together by the second horizontal plate 84 so as to form an integral unit. The front wall 66, the rear wall 68, the rear wall 76, and the right wall 78 configured as described above are, for example, formed by extrusion.

The overall peripheral wall 64 configured by the front wall 66, the rear wall 68, the left wall 76, and the right wall 78 has a substantially rectangular frame shape in plan view, and a vehicle front-rear direction dimension and a vehicle width direction dimension of the space enclosed by the peripheral wall 64 are larger than a total vehicle front rear direction dimension and a vehicle width direction dimension of all of the plural tank bodies 22 when in a state arranged alongside one another in the vehicle width direction. A vehicle vertical direction dimension of the peripheral wall 64 is larger than a maximum vehicle vertical direction dimension of vehicle front-rear direction intermediate portions of the tank bodies 22 (a maximum diameter dimension of outer peripheral portions of the tank bodies 22).

The plural tank bodies 22, the first manifold 32, the second connectors 40 of the second manifold 38, and the second tubes 42 of the second manifold 38 are housed at the inner side of the peripheral wall 64, in a state spaced apart from the peripheral wall 64. A hole 86 is formed substantially at the vehicle width direction center of the front wall 66 of the peripheral wall 64. The hole 86 penetrates the front wall 60 in the vehicle front-rear direction. The third tube 44 of the second manifold 38 is provided in a state passing through the hole 86. An outer peripheral face of the third tube 44 contacts at least a portion of at least one out of the first outer plate 70, the first inner plate 72, or the first horizontal plate 74 of the front wall 66 within the hole 86, such that heat is capable of being transmitted between the third tube 44 and the front wall 66.

The bottom wall 62 of the case 60 is provided with plural first attachment brackets 88. The first attachment brackets 88 are disposed with predetermined spacings between each other in the vehicle width direction, at the vehicle front of the rear wall 68 at the vehicle rear end portion of the bottom wall 62. Each first attachment bracket 88 includes a first support portion 90. First legs 92 extend toward the vehicle lower side from both vehicle front and rear ends and troth both vehicle width direction ends of the first support portion 90. A vehicle lower end portion of each first leg 92 is fixed to the bottom wall 62. First attachment tabs 94 are provided to predetermined first tubes 36 of the first manifold 32 described above so as to correspond to the first attachment bracket 88, and the first attachment tabs 94 are fixed to the first support portions 90 of the respective first attachment brackets 88 by fasteners such as bolts.

The bottom wall 62 of the case 60 is also provided with plural second attachment brackets 96. The second attachment brackets 96 are disposed with predetermined spacings between each other in the vehicle width direction, at the vehicle rear of the front wall 66 at the vehicle front end portion of the bottom wall 62. Each second attachment bracket 96 includes a second support portion 98. Second legs 100 extend toward the vehicle lower side front a vehicle rear end and from both vehicle width direction ends of the second support portion 98. A vehicle lower end potion of each second leg 100 is fixed to the bottom wall 62.

An extension portion 102 extends toward the vehicle upper side from a vehicle front end of each second support portion 98, and a vehicle upper end portion of each extension portion 102 is fixed to the first inner plate 72 of the front wall 66. Second attachment tabs 104 are provided to predetermined second tubes 42 of the second manifold 38 described above so as to correspond to the second attachment brackets 96, and the second attachment tabs 104 are fixed to the second support portions 98 of the respective second attachment brackets 96 by fasteners such as bolts. The tank bodies 22 are thus disposed spaced apart front the bottom wall 62 at the vehicle upper side of the bottom wall 62.

A cover 106 that configures the case 60 together with the bottom wall 62 and the peripheral wall 64 is provided at the vehicle upper side of the peripheral wall 64 of the case 60. The cover 106 is configured in a substantially rectangular flat plate shape in plan view. The cover 106 is disposed spaced apart from the tank bodies 22 at the vehicle upper side of the tank bodies 22. An outer peripheral portion of the cover 106 is fixed to a vehicle upper end portion of the peripheral wall 64.

As described above, the bottom wall 62, the peripheral wall 64 (namely, the front wall 66, the mar wall 68, the left wall 76, and the right wall 78), and the cover 106 configuring the case 60 are formed from a metal such as aluminum or an aluminum alloy. The bottom wall 62, the peripheral wall 64, and the cover 106 configuring the case 60 are able to withstand a higher temperature than the melting temperature of the plug 54 of the fusible plug 50 (namely, the opening temperature of the fusible plug 50). Moreover, the thermal conductivity of the case 60 is greater than the thermal conductivity of the CFRP configuring the first reinforcing layer 28 and the CFRP configuring the second reinforcing layer 30 of the tank bodies 22, and is also higher than the thermal conductivity of air.

As described above, the tank bodies 22 are disposed inside the case 60 so as to be spaced apart front each of the bottom wall 62, the peripheral wall 64, and the cover 106 that configure the case 60. Gaps are thus formed between the tank bodies 22 and the bottom wall 62, the peripheral wall 64, and the cover 106 of the ease 60. Air, which has lower thermal conductivity than the metal configuring the bottom wall 62, the peripheral wall 64, and the cover 106 of the case 60, is present in these gaps. An air layer 108, serving as a low thermal conductivity layer, is thus provided between the tank bodies 22 and the bottom wall 62, the peripheral wall 64, and the cover 106 of the ease 60.

Next, explanation follows regarding operation of the first exemplary embodiment.

In the high pressure tank 10, when a vehicle rear portion of the case 60 is heated from below the vehicle by a heat source 110 such as a fire, heat Q from the heat source 110 that is imparted to the bottom wall 62 of the case 60 is transmitted from the vehicle rear portion of the bottom wall 62 to the front wall 66 of the ease 60 via at vehicle front portion of the bottom wall 62. The third tube 44 of the second manifold 38, serving as an intermediate heat transmitting section, is provided in a state passing through the hole 86 in the front wall 66, and the outer peripheral face of the third tube 44 is in contact with at least a portion of at least one out of the first outer plate 70, the first inner plate 72, or the first horizontal plate 74 of the front wall 66 within the hole 86, thus enabling heat to be transmitted between the third tube 44 and the front wall 66.

The heat Q transmitted to the front wall 66 is thus transmitted to the third tube 44 of the second manifold 38. The valve 46, serving as an intermediate heat transmitting section, coupled to the third tube 44 of the second manifold 38. The heat Q transmitted to the second manifold 38 is thus transmitted to the valve 46, and the heat is then transmitted to the cylinder body 52 of the fusible plug 50 via the valve 46.

In this manner, the heat Q is transmitted to the cylinder body 52 of the fusible plug 50. Accordingly, if the temperature of the cylinder body 52 reaches the predetermined opening (namely, the melting temperature of the plug 54) or greater, the plug 54 inside the cylinder both 52 melts. The molten plug 54 thus flows out of the cylinder body 52, opening up the interior of the cylinder body 52. In this state, the interior of the cylinder body 52 is linked to the interiors of the respective tank bodies 22 through the valve 46 and the second manifold 38. The hydrogen gas inside the respective tank bodies 22 is thus released to the exterior of the case 60 via the second manifold 38, the valve 46, and the cylinder both 52.

Note that in the present exemplary embodiment, the bottom wall 62 of the case 60 that is heated from below the vehicle by the heat source 110 is formed from aluminum or an aluminum alloy, and the thermal conductivity of the bottom wall 62 is higher than thermal conductivity of the CFRP configuring the first reinforcing layers 28 and of the CFRP configuring the second reinforcing layers 30 of the tank bodies 22. This thereby enables the heat Q to be transmitted to the cylinder body 52 of the fusible plug 50 more quickly, thus releasing the hydrogen gas in the respective tank bodies 22 more quickly, than in cases in which vehicle rear sections of the tank bodies 22 are heated directly by the heat source 110.

Moreover, as described above, the bottom wall 62 of the case 60 housing the tank bodies 22 transmits the heat Q to the cylinder body 52 of the fusible plug 50 more quickly than in cases in which vehicle rear sections of the tank bodies 22 are directly heated by the heat source 110. Accordingly, there is no need to provide each of the tank bodies 22 with a special configuration (member) just to transmit the heat Q from the heat source 110 to the cylinder body 52 of the fusible plug 50. This thereby enables an increase in the number of configuration components of the high pressure tank 10 to be suppressed.

Moreover, the case 60 is capable of housing all of the plural tank bodies 22 inside the case 60. Namely, the shape at the inner side of the peripheral wall 64 and the shapes of both the bottom wall 62 and the cover 106 in plan view are larger than the overall combined shape of the plural tank bodies 22 when disposed. Accordingly, the tank of 22 can be prevented or effectively suppressed from being exposed to flames, hot air, or the like from the heat source 110, enabling heating of the tank bodies 22 to be suppressed.

Moreover, the plural rank bodies 22 are disposed spaced apart from the bottom wall 62, the peripheral wall 64, and the cover 106 of the case 60, thereby forming the air layer 108 between the plural tank bodies 22 and the bottom wall 62, the peripheral wall 64, and the cover 106 of the case 60. Air has lower thermal conductivity than the metal from which the bottom wall 62, the peripheral wall 64, and the cover 106 are formed. Heat in the bottom wall 62 is thus less readily transmitted to the tank bodies 22 than, for example, in cases in which the plural tank bodies 22 are disposed in a state of contact with the bottom wall 62. As described above, heating of the tank bodies 22 can be suppressed, thereby suppressing an increase in the temperature of the tank bodies 22, when the case 60 is heated from the exterior of the case 60 by the heat source 110. In such cases, the plug 54 of the fusible plug 50 can therefore be melted before the tank bodies 22 reach a high temperature state.

The plural tank bodies 22 are provided alongside one another in a row (a layer) along the vehicle width direction above the bottom wall 62 of the case 60. Moreover, the tank bodies 22 are laid out dose to one another in the vehicle width direction. This thereby enables a large difference to be suppressed from arising between conditions such as temperature increase in the respective tank bodies 22 in cases in which the bottom wall 62 of the case 60 is heated from the vehicle lower side by the heat source 110.

Moreover, in the present exemplary embodiment, the thermal conductivity of the metal from which the second mane fold 38 is formed is higher than the thermal conductivity of the from which the second manifold 38 is formed is higher than the thermal conductivity of the reinforcing layer 30 of the tank bodies 22, and is also higher than the thermal conductivity of air. Accordingly, heat Q transmitted to the front wall 66 of the case 60 can be transmitted to the third tube 44 of the second manifold 38 quickly, and moreover, the heat Q transmitted to the third tube 44 can be transmitted to the cylinder body 52 of the fusible plug 50 quickly.

Moreover, in the present exemplary embodiment, the fusible plug 50 provided to the valve 46 is disposed at the exterior of the case 60. Accordingly, the hydrogen gas inside the tank bodies 22 can be released to the exterior of the case 60 when the plug 54 of the fusible plug 50 melts.

The cylinder body 52 of the fusible plug 50 is linked to all of the tank bodies 22. Accordingly, the hydrogen gas inside all of the tank bodies 22 can be released when the plug 54 of the fusible plug 50 melts.

In the present exemplary embodiment, all of the tank bodies 22 are housed within the case 60, thereby enabling the tank bodies 22 to be protected against external impact and the like by the case 60, and enabling shock resistance to be improved.

Moreover, in the present exemplary embodiment, the tank bodies 22 are long in the vehicle front-rear direction, and plural of the tank bodies 22 are disposed alongside one another in the vehicle width direction. This thereby enables the pressure resistance of the individual tank bodies 22 to internal pressure to be secured, even with a large combined total capacity of the lank bodies 22. This thereby enables, for example, the overall high pressure tank 10 to be made thinner in the vehicle vertical direction.

Second Exemplary Embodiment

Next, explanation follows regarding a second exemplary embodiment.

Figure 5:
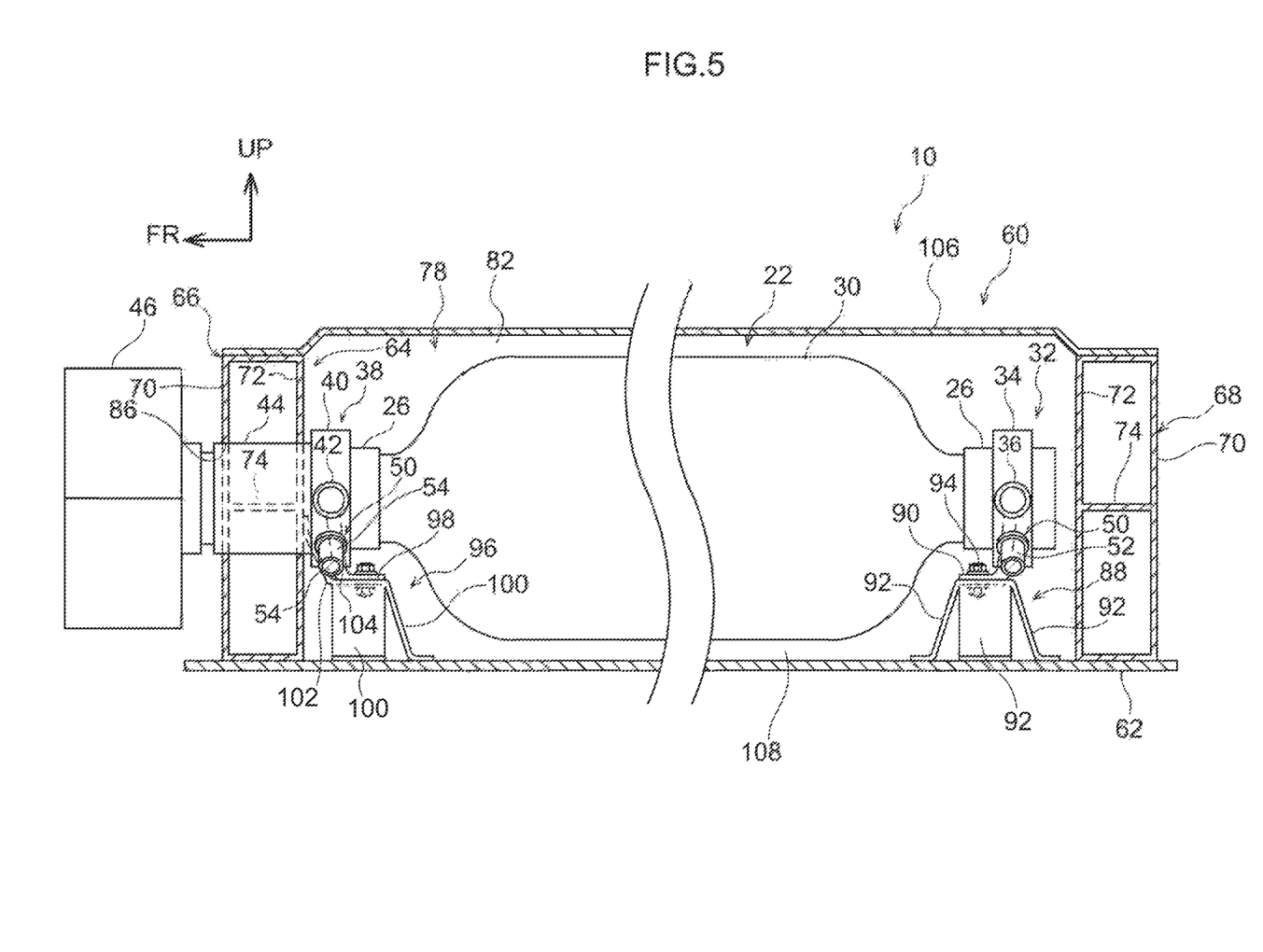
FIG. 5 is a side view cross-section illustrating a vehicle front portion and a vehicle rear portion of a high pressure tank according to a second exemplary embodiment.

As illustrated in FIG. 5. in the present exemplary embodiment the fusible plug 50 is not provided to the valve 46. In the present exemplary embodiment, fusible plugs 50 are provided to each of the plural first connectors 34 of the first manifold 32, and fusible plugs 50 are provided to each of the plural second connectors 40 of the second manifold 38. The interior of a cylinder body 52 of each fusible plug 50 is linked to the interior of the first connector 34 or the second connector 40 to which it is attached.

The cylinder bodies 52 of the fusible plugs 50 extend substantially toward the vehicle lower side from portions of the fusible plug 50 coupled to the first connectors 34 or the second connectors 40. Vehicle lower ends of the cylinder bodies 52 are thus closer than the portions coupled to the first connectors 34 or the second connectors 40 to the bottom wall 62 of the case 60. Accordingly, in cases in which a heat source 110 (omitted from illustration in FIG. 5) is present at the vehicle lower side of the bottom wall 62 of the case 60, heat Q transmitted from the heat source 110 to the bottom wall 62 can be transmitted to the cylinder bodies 52 of the fusible plugs 50 more quickly than to the tank bodies 22. This thereby enables the plugs 54 of the fusible plugs 50 to be melted before the tank bodies 22 reach a high temperature state.

In the present exemplary embodiment configured in this manner, the hydrogen gas is released from all of the tank bodies 22 through the cylinder body 52 of the fusible plug 50 of which, out of all of the fusible plugs 50, the plug 54 melts soonest. This thereby enables the hydrogen gas to be released quickly from the tank bodies 22, even if the position of the heat source 110 is offset with respect to the case 60 in the vehicle front-rear direction, the vehicle width direction, or the like.

Note that in the second exemplary embodiment, the fusible plugs 50 arc provided to each of the plural first connectors 34 of the first manifold 32, and the fusible plugs 50 are provided to each of the plural second connectors 40 of the second manifold 38. However, configuration may be made in which fusible plugs 50 are provided only to the first connectors 34 of the first manifold 32, or configuration may be made in which fusible plugs 50 are provided only to the second connectors 40 of the second manifold 38. Moreover, configuration may be made in which a fusible plug 50 is provided to one out of the plural first connectors 34 of the first manifold 32, or configuration may be made in which a fusible plug 50 is provided to one out of the plural second connectors 40 of the second manifold 38.

Moreover, in each of the exemplary embodiments described above, configuration is made in which the case 60 is formed from aluminum or an aluminum alloy. However, the material used for the case 60 may be a metal or alloy other than aluminum or an aluminum alloy, or may be a material other than a metal. Namely, it is sufficient that the material of the case 60 has higher thermal conductivity than the first reinforcing layer 28 and the second reinforcing layer 30 of the tank bodies 22, has higher thermal conductivity than air, and is able withstand a higher temperature than the melting temperature of the plug 54 of the fusible plug 50.

Moreover, in the exemplary embodiments described above, a cover member is configured by the case 60. However, for example, configuration may be made in which the peripheral wall 64 and the cover 106 are not provided, and a cover member is configured by the bottom wall 62 alone. Alternatively, configuration may be made in which the plural rank bodies 22 are covered by a cover member at vehicle front-rear direction intermediate portions of the tank bodies 22. Namely, it is sufficient that a cover member has a configuration provided straddling the plural tank bodies 22 respectively serving as container bodies, and there is no need for a configuration in which the tank bodies 22 are housed within a cover member, nor a configuration in which all of the tank bodies 22 are covered by a cover member.

Moreover, in exemplary embodiments described above, the low thermal conductivity layer is configured by the air layer 108. However, it is sufficient that a low thermal conductivity layer have lower thermal conductivity than the case 60. Instead of air, a member configured from a material having lower thermal conductivity than the material of the case 60 may be provided between the case 60 and the tank bodies 22, or the interior of the case 60 may be configured by a vacuum, such that a vacuum layer between the case 60 and the tank bodies 22 configures the low thermal conductivity layer.

Moreover, in the exemplary embodiments described above, configuration is made in which the tank bodies 22 are disposed spaced apart from the bottom wall 62 of the case 60 toward the vehicle upper side of the bottom wall 62. However, the tank bodies 22 may be disposed on the bottom wall 62 in a state in which the tank bodies 22 abut the bottom wall 62.

Moreover, in the first exemplary embodiment, configuration is made in which the heat Q transmitted from the heat source 110 to the case 60 is transmitted to the cylinder body 52 of the fusible plug 50 through the second manifold 38 and the valve 46 that serve as intermediate heat transmitting members. However, the configuration of intermediate heat transmitting members that are interposed between a cover member and an opening section so as to transmit heat from the cover member to the opening section is not limited to that of the second manifold 38 and the valve 46, and configuration may be made such that heat Q is transmitted from the case 60 to the cylinder body 52 of the fusible plug 50 via members other than the second manifold 38 and the valve 46.

Moreover, in the first exemplary embodiment, configuration is made in which in the hole 86 in the front wall 66 of the case 60, the outer peripheral face of the third tube 44 of the second manifold 38 contacts at least a portion of at least one out of the first outer plate 70, the first inner plate 72, or the first horizontal plate 74 of the front wall 66. However, for example, configuration may be made in which heat Q is transmitted from the front wall 66 to the third tube 44 by providing a thermal connection member configured from aluminum, an aluminum alloy, or the like in a gap between an inner peripheral portion of the hole 86 in the from wall 66 and the outer peripheral face of the third tube 44.

Moreover, in each of the exemplary embodiment described above, configuration is made in which the outer peripheral thee of the coupler of the valve 46 is formed with a male thread, and an inner peripheral face of the third tube 44 of the second manifold 38 is formed with a female thread, and the coupler of the valve 46 is inserted into the third tube 44 and the male thread of the coupler of the valve 46 is screwed together with the female thread of the third tube 44,. However, for example, configuration may be made in which an outer peripheral face of the third tube 44 is formed with a male thread, and an inner peripheral face of the coupler of the valve 46 is formed with a female thread, and the third tube 44 is inserted into the coupler of the valve 46 and the male thread of the third tube 44 is screwed together with the female thread of the coupler of the valve 46. Namely, it is sufficient that the configuration used to couple the third tube 44 and the coupler of the valve 46 together is capable of coupling the third tube 44 and the coupler of the valve 46 together in a state in which the interior of the third tube 44 is in communication with the interior of the coupler of the valve 46.

Moreover, in the exemplary embodiments described above, configuration is made in which plural of the tank bodies 22 are disposed in a row (a layer) along the vehicle width direction. However, for example, plural of the tank bodies 22 may be disposed alongside one another in a row along the vehicle front-rear direction, such that the length directions of the tank bodies 22 run along the vehicle width direction.

Moreover, in the exemplary embodiments described above, configuration is made in which plural of the tank bodies 22 are disposed in a row (a layer) along the vehicle width direction. However, configuration may be made in which plural of the tank bodies 22 are provided in a row running along the vehicle vertical direction.

Moreover, in the exemplary embodiments described above, configuration is made in which gaps that are smaller than the diameter of the outer peripheral portions of the tank bodies 22 are provided between neighboring tank bodies 22 in the vehicle width direction. However, configuration may be made in which neighboring tank bodies 22 in the vehicle width direction touch each other, or configuration may be made in which the spacing of gaps between neighboring tank bodies 22 in the vehicle width direction is at least the diameter of the outer peripheral portions of the tank bodies 22.

What is claimed is:
1. A high pressure container comprising:
   a plurality of container bodies, each of the container bodies housing a fluid in a high pressure state and being able to release the fluid through a release portion;

an opening section that is linked to the container bodies, and that opens at or above a predetermined opening temperature to release the fluid inside the container bodies; and a cover member that straddles the plurality of container bodies, that houses the plurality of container bodies inside the cover member, that is able to withstand a temperature of no less than the opening temperature, that is linked to the opening section, and that is capable of transmitting heat to the opening section, wherein:

a thermal conductivity of the cover member is higher than a thermal conductivity at a surface of the container bodies;

a communicating section, through which the plurality of container bodies are linked via the release portion, is housed inside the cover member;

an intermediate heat transmitting section, connected to the communicating section and provided with the opening section, is provided on an exterior of the cover member; and the opening section includes a fusible plug including a cylinder body and a plug provided inside the cylinder body, the plug being formed from a metal having a melting temperature which is less than or equal to the predetermined opening temperature.

2. The high pressure container of claim 1, wherein the cover member is larger than the plurality of container bodies as viewed along a direction in which the cover member and the plurality of container bodies face each other.

3. The high pressure container of claim 1, wherein the plurality of container bodies are covered by the cover member from a plurality of directions by being housed inside the cover member.

4. The high pressure container of claim 1, further comprising a low thermal conductivity layer that is provided between the cover member and the plurality of container bodies, and that has lower thermal conductivity than the cover member.

5. The high pressure container of claim 4, wherein the low thermal conductivity layer is configured by a layer of air.

6. The high pressure container of claim 1, wherein:

the communicating section includes a single passageway that is linked to all of the container bodies and through which the fluid that has left the container bodies passes; and the opening section is provided to the passageway.

7. The high pressure container of claim 1, wherein a plurality of opening sections are provided corresponding to each of the release portions of the plurality of container bodies.

8. The high pressure container of claim 1, wherein the plurality of container bodies are disposed alongside one another in a row along a vehicle width direction or are disposed alongside one another in a row along a vehicle front-rear direction at a vehicle lower side of a floor section of a vehicle, and the cover member is provided at least at a lower side of the plurality of container bodies.

9. The high pressure container of claim 1, wherein the cover member includes a bottom wall presenting a substantially rectangular plate shape in plan view, and a peripheral wall provided above the bottom wall, the peripheral wall including an inner plate, an outer plate, and a horizontal plate provided between the inner plate and the outer plate, and wherein the plurality of container bodies are disposed above and spaced apart from the bottom wall.

10. The high pressure container of claim 9, wherein each of the container bodies includes a casing body, a first cap at a first end of the casing body, and a second cap at a second end of the casing body, wherein a first manifold includes plural first connectors connected to the first caps of the plurality of container bodies, the plural first connectors being supported by plural first attachment brackets provided on the bottom wall, and wherein a second manifold includes plural second connectors connected to the second caps of the plurality of container bodies, the plural second connectors being supported by plural second attachment brackets provided on the bottom wall.

11. The high pressure container of claim 10, wherein the second manifold includes a tube having a first end coupled to one of the plural second connectors and a second end coupled to a valve, the tube passing through a hole provided on the peripheral wall.

* * * * *